(12) United States Patent
Trivedi et al.

(10) Patent No.: US 12,137,043 B2
(45) Date of Patent: Nov. 5, 2024

(54) KEY PERFORMANCE INDICATOR PERFORMANCE THRESHOLD CORRELATION APPARATUS AND METHOD

(71) Applicant: Rakuten Mobile, Inc., Tokyo (JP)

(72) Inventors: Vishvesh Trivedi, Tokyo (JP); Anshul Bhatt, Tokyo (JP); Dhananjay Chaubey, Tokyo (JP); Alok Singh Pawar, Madhya Pradesh (IN); Manish Patidar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/757,942

(22) PCT Filed: May 18, 2022

(86) PCT No.: PCT/US2022/029743
§ 371 (c)(1),
(2) Date: Jun. 24, 2022

(87) PCT Pub. No.: WO2023/224608
PCT Pub. Date: Nov. 23, 2023

(65) Prior Publication Data
US 2024/0171493 A1    May 23, 2024

(51) Int. Cl.
G06Q 10/06     (2023.01)
G06F 11/34     (2006.01)
G06Q 10/0639   (2023.01)
G06Q 50/50     (2024.01)
H04L 41/0681   (2022.01)
H04L 43/16     (2022.01)

(52) U.S. Cl.
CPC .......... *H04L 43/16* (2013.01); *H04L 41/0681* (2013.01)

(58) Field of Classification Search
CPC ..... H04L 43/16; H04L 41/0681; G06Q 10/06; G06Q 50/50; G06Q 10/0639; G06F 11/34
See application file for complete search history.

(56) References Cited

U.S. PATENT DOCUMENTS

| | | | |
|---|---|---|---|
| 9,338,296 B2 * | 5/2016 | Fox | G06Q 10/06393 |
| 10,089,773 B1 * | 10/2018 | Haravu | G09G 5/026 |
| 2017/0046374 A1 * | 2/2017 | Fletcher | G06F 3/04842 |
| 2018/0359137 A1 * | 12/2018 | Vaderna | H04L 41/0631 |
| 2021/0160158 A1 * | 5/2021 | Chintala | G06F 16/2246 |

* cited by examiner

*Primary Examiner* — Glenford J Madamba
*Assistant Examiner* — Hassan A Khan
(74) *Attorney, Agent, or Firm* — HAUPTMAN HAM, LLP

(57) ABSTRACT

A method includes processing parameter selection inputs corresponding to a threshold correlation rule associated with monitoring a communication network. The method also includes processing node selection inputs. The method further includes causing a list of key performance indicators (KPIs) associated with monitoring the communication network to be populated based on the parameter selection inputs and the node selection inputs. The method also includes processing threshold comparison inputs and breach consistency condition inputs to generate the threshold correlation rule. The method further includes comparing KPI values to a threshold comparison target and causing an alert to be generated indicating that an operating state of the communication network is outside a preset performance level.

20 Claims, 9 Drawing Sheets

FIG. 2

Threshold Correlation Rule List

| Rule ID | Rule Name | Domain | Network Service Provider | Technology | Auto TT | Created By | Created Date |
|---|---|---|---|---|---|---|---|
| ##### | Rule A | Domain A | Vendor A | Technology A | Yes | User A | DD-MM-YYYY |
| ##### | Rule B | Domain B | Vendor B | Technology A | Yes | User A | DD-MM-YYYY |
| ##### | Rule C | Domain B | Vendor B | Technology A | No | User B | DD-MM-YYYY |
| ##### | Rule D | Domain C | Vendor B | Technology B | No | User A | DD-MM-YYYY |
| ##### | Rule E | Domain B | Vendor C | Technology B | Yes | User C | DD-MM-YYYY |

FIG. 3

Rule Detail and Node Selection Interface

Exclude Planned Event? ☐

Rule Detail Options

| Rule Name ▽ | Domain ▽ | Technology ▽ |
| Network Service Provider ▽ | Classification ▽ | Priority ▽ |
| Service Affected ▽ | | |

Select Node and Aggregation

| Country Level ▽ | Region ▽ | State/Prefecture ▽ |
| City ▽ | Cluster ▽ | |
| Node Aggregation ▽ | POD Level ▽ | |

Upload Node

Back | Cancel | Next

FIG. 5A

Setup Interface

Select Threshold Comparison Frequency
- ☐ Daily
- ☐ Weekly
- ☐ Monthly
- ☐ 15 Minutes
- ☐ Hourly
- ☐ Custom Frequency Timing
- ☐ Bouncing Busy Hour
- ☐ Network Busy Hour
- ☐ Busiest Day Select Threshold Comparison and Consistency Conditions

| Check Consistency ▽ | Out of Last # - X/10 ▽ | Instances Count # - X/10 ▽ |

Threshold Comparison Condition

Trigger Condition Editor

. . .

[Back]  [Cancel]  [Create]

500

KEY PERFORMANCE INDICATOR PERFORMANCE THRESHOLD CORRELATION APPARATUS AND METHOD

RELATED APPLICATIONS

The present application is a National Phase of International Application No. PCT/US2022/029743, filed May 18, 2022.

BACKGROUND

Network operators, network service providers and device manufacturers (e.g., wireless, cellular, etc.) are continually challenged to deliver value and convenience to consumers by, for example, providing compelling communication networks and network services that are dependable and capable of being flexibly constructed, scalable, diverse, and economically operated. To provide such communication networks and network services, network operators, network service providers and device manufacturers often track key performance indicators (KPIs) that are indicative of an operating state of a communication network and/or various network services and/or network devices.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram of a graphical user interface, in accordance with one or more embodiments.

FIG. 3 is a diagram of a graphical user interface, in accordance with one or more embodiments.

FIG. 5A is a diagram of a graphical user interface, in accordance with one or more embodiments.

DETAILED DESCRIPTION

Figure 1:
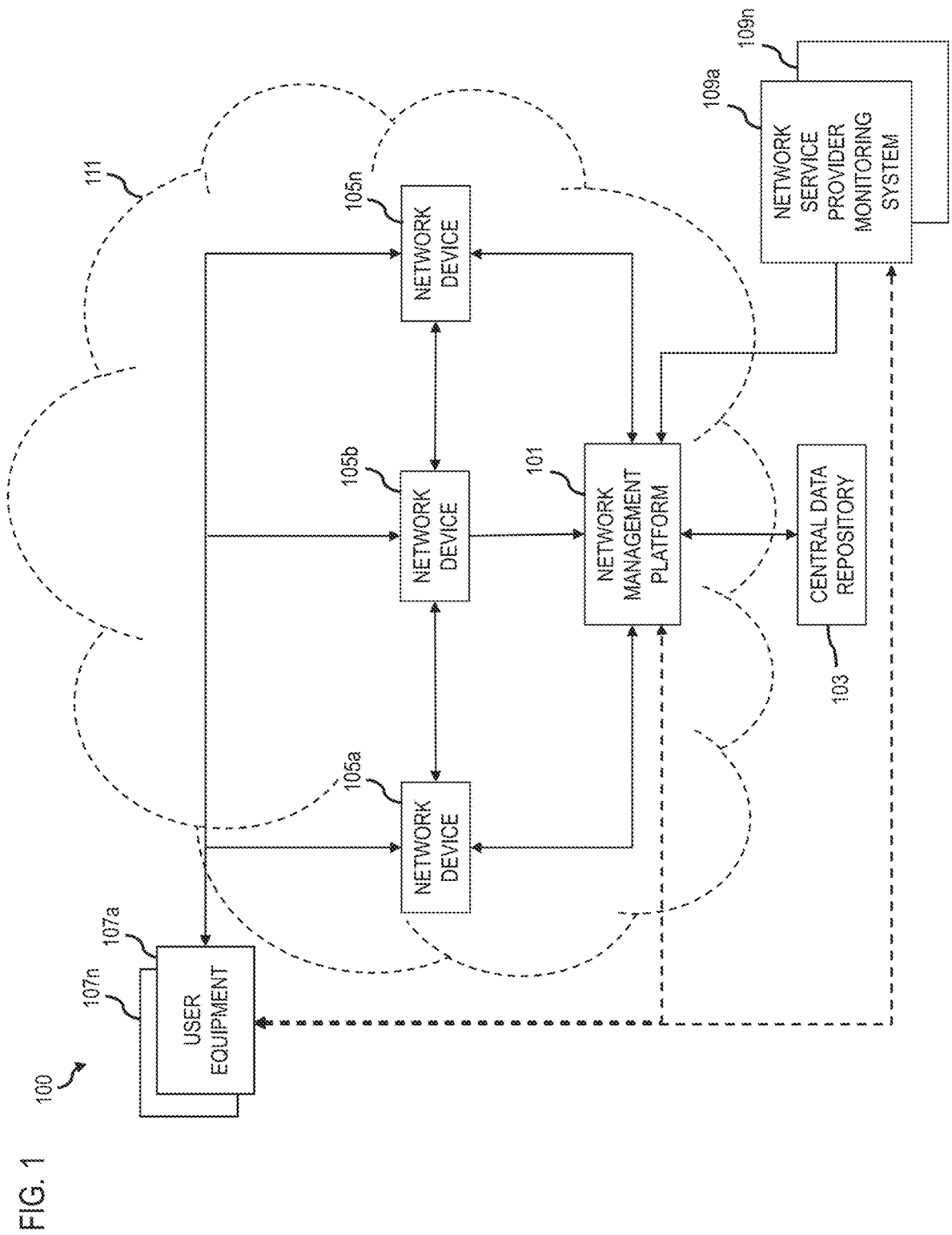
FIG. 1 is a diagram of a KPI monitoring and centralized data storage system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Communication networks and network services are often provided by static or inflexible systems that are difficult to configure, scale, and deploy over various target areas. Dependable provision of communication networks and/or network services that are capable of being flexibly constructed, scalable and diverse is often reliant on the collection, analysis and reporting of information regarding multiple network functions, network services, network devices, etc. that affect the performance, accessibility, configuration, scale, and/or deployment of a communication network, various network functions, network services, and the like.

Network service providers often deploy network monitoring systems that track various key performance indicators (KPIs) of an aspect of a network for determining how well that aspect and/or the network is performing. KPIs are often KPI values and/or trends that are compared to certain thresholds to indicate the relative performance of a communication network, network service, network device, etc. The KPI values are often based on monitoring data referred to herein as system data.

Sometimes, when a KPI value for a certain network function, network service or feature is below a preset threshold, the KPI value may imply that the network is operating normally, whereas when the KPI value is above or equal to the preset threshold, the KPI value implies that the network is operating below expectation, which in turn may indicate that some unexpected event (e.g., a hardware failure, capacity overload, a cyberattack, etc.) has occurred. Accordingly, a series of actions can be carried out by the network monitoring system such as alerting the network operator, shifting a network function from a problematic server to a healthy server, temporarily shutting down the network, or some other suitable action. Of course, depending on the network configuration, a condition in which the KPI value is higher than or equal to a threshold can also indicate that the network is operating normally, while a condition in which the KPI value is below the threshold indicates that the network is operating below expectation. Several other types of threshold configurations are possible as the threshold configurations may vary depending on the needs of a specific user or specific network operator, depending on individual preference, type of KPI being monitored, type of KPI created by a user for monitoring, type of system data that is processed for monitoring a KPI, and the like.

Network operators that coordinate and deploy communication networks that include network services (e.g., hardware, software, etc.) provided by one or more network service providers are reliant on system data supplied to the network operator by the one or more network service providers for monitoring KPIs. Such communication networks often involve network services across multiple domains such as radio area network (RAN), base station subsystem (BSS), platform, core network, etc., various technologies (such as 3G, 4G, LTE, 5G, etc.), multiple locations, various software interfaces, multiple devices, etc. that are proprietary and/or optimized by a specific network service provider.

As the communication network evolves and improves, a single communication network may involve an ever-changing quantity of network service providers for providing network services and/or that are associated with providing network services associated with various aspects of the communication network (e.g., domains, technologies, locations of services, etc.) and, as a result, the state of the communication network may vary dynamically with the addition and/or subtraction of network service providers, a change in one or more network services, etc.

Each network service provider often uses a corresponding monitoring system to monitor performance of the network service(s) provided by that network service provider to gather various system data (e.g., raw data, processed data, and/or pre-processed data provided by a network service provider's monitoring system, pre-processed KPI data provided by the network service providers, etc.) usable by the network operator for determining KPI values indicative of the state of the communication network. The network service providers send the system data to the network operator for monitoring the status of the communication network in consideration of the system data associated with the network service(s) provided by each network service provider. For example, the network operator uses the system data supplied by the network service providers to generate KPI value(s) and/or to evaluate the quality of services provided by each of the network service providers.

Network operators consistently check KPIs, for example, to ensure validity and stability of the communication network. Then, based on a determination that an anomaly occurs in one or more KPIs, take an appropriate action such as making a change in network service providers or network devices that are used to provide one or more network services that are malfunctioning to one or more alternative network service providers and/or one or more alternative network devices to ensure the communication network is operating and available for consumers.

As the communication network evolves, the services, network devices, coverage area, network service providers, etc., may change, a quantity of various KPIs may change, and monitoring of the communication network becomes increasingly complicated. For example, a KPI monitoring system may have thousands of KPIs that may or may not be applicable to various scenarios within the communication network, and monitoring all of those KPIs individually or for an initially created purpose may be difficult or not applicable to a user or for monitoring various aspects of the communication network.

FIG. 1 is a diagram of a KPI monitoring and centralized data storage system 100, in accordance with one or more embodiments.

System 100 makes it possible for a network operator to monitor KPIs associated with a communication network provided by the network operator based on system data received from one or more network service providers that provide network services upon which the communication network is based. System 100 also makes it possible to simplify the monitoring of the communication network by facilitating the generation of threshold correlation rules that are applied when monitoring one or more KPIs.

System 100 comprises a network management platform 101, a central data repository 103, one or more network devices 105a-105n (collectively referred to as network devices 105), and one or more user equipment (UE) 107a-107n (collectively referred to as UE 107). The network management platform 101, the central data repository 103, the one or more network devices 105, and/or the one or more user equipment (UE) 107 are communicatively coupled by way of a communication network 111. In some embodiments, the communication network 111 is orchestrated by the network management platform 101 which combines a plurality of network services provided by one or more network service providers via the network devices 105. In some embodiments, the network management platform 101 is a network orchestrator that implements the communication network 111. In some embodiments, the network management platform 101 is a portion of a network orchestrator that implements the communication network 111.

The network service providers associated with the network services provided have corresponding network service provider monitoring systems 109a-109n (collectively referred to as network service provider monitoring system 109). The network service provider monitoring systems 109 collect system data associated with the network services provided to communication network 111 and send that system data to the network management platform 101 to facilitate monitoring of the state of the communication network 111.

In some embodiments, network management platform 101 comprises a set of computer readable instructions that, when executed by a processor such as a processor 803 (FIG. 8), causes network management platform 101 to perform the processes discussed in accordance with one or more embodiments. In some embodiments, network management platform 101 is remote from the network devices 105. In some embodiments, network management platform 101 is a part of one or more of the network devices 105. In some embodiments, one or more processes the network management platform 101 is configured to perform is divided among one or more of the network devices 105 and a processor remote from the network devices 105. In some embodiments, the network management platform 101 is at least partially implemented by a UE 107.

In some embodiments, central data repository 103 has searchable information stored therein that includes stored system data, rules defining various KPIs, threshold correlation rules applied when monitoring one or more KPIs, network functions capable of being implemented in the network involving one or more of network usage, timing, connected devices, location, network resource consumption, cost data, example network KPIs, KPI monitoring profiles corresponding to one or more users, KPI evaluation profiles corresponding to one or more users, other suitable elements or information, or a combination thereof. Central data repository 103 is a memory such as a memory 805 (FIG. 8) capable of being queried or caused to store data in accordance with one or more embodiments. In some embodiments, the network management platform 101 and the central data repository 103 together form a network orchestrator that implements the communication network 111.

In some embodiments, network management platform 101 generates a graphical user interface that is output to a display by way of a UE 107 or a terminal associated with network management platform 101 for a user (e.g., a network operator, a network administrator, and any personnel which would like to or is responsible to monitor the state of the communication network 111), so as to allow the user to monitor the operating state of the communication network 111. In some embodiments, the user interface is accessible via a web browser such as by way of a website or a web browser plug-in.

The network service provider monitoring system(s) 109 of each of the plurality of network service providers continuously monitor their own corresponding network services and periodically send at predetermined times (e.g., every 5 minutes, every 15 minutes, every 30 minutes, etc.) the monitored system data to the network management platform 101. In some embodiments, the network management platform 101 causes the monitored system data to be stored in the central data repository 103. In some embodiments, the central data repository 103 is controlled by the network operator.

The system data is communicated from the network service provider monitoring systems 109 to the network management platform 101 via one or more of a wireless communication channel, a wired communication channel, enhanced messaging service (EMS), email messaging, data packet transmission, or some other suitable type of data transmission which is optionally the same or different among the plurality of network service providers.

In some embodiments, the network management platform 101 continuously monitors the system data received from the network service provider monitoring system(s) 109 by processing received system data that is stored in the central data repository 103.

In some embodiments, when a user (e.g., a network operator, a network service provider, and/or any personnel that would like to or is responsible to monitor the system) wants to monitor one or more KPIs, the network management platform 101 makes it possible for a user to access to the centralized platform via a UE 107. The network management platform 101 determines the identity of the user based on user credentials, access device, or some other suitable manner, and provides a graphical user interface to the user via a UE 107. In some embodiments, the network management platform 101 limits functions available to the user by way of the graphical user interface depending on the type of user (e.g., a regular user may have access to fewer functions than a VIP user, a network administrator may have access to all functions, etc.).

In use, when a network operator wants to monitor one or more KPIs, the network operator accesses the network management platform 101 by way of the network operator's terminal (e.g., a UE 107 having connectivity to the communication network 111).

After authentication and authorization based on receiving and processing user credentials (e.g., user ID and password, etc.), the network management platform 101 retrieves a user profile of the network operator (e.g., which may be stored in the central data repository 103 or some other suitable memory or database having connectivity to system 100), accesses the central data repository 103 to determine (based on the user profile) which stored system data is related to the network operator, and then generates and presents a list of threshold correlation rules that have been created by the user and/or one or more other users.

The network management platform 101 causes the list of threshold correlation rules to be output to the graphical user interface. The network management platform 101 then facilitates viewing the existing threshold correlation rules.

Based on the user's authorization level according to the user credentials, the network management platform 101 is configured to allow a user to one or more of view the outputs of one or more pre-existing threshold correlation rules, edit one or more of the pre-existing threshold correlation rules, and/or create new threshold correlation rules.

To create a new threshold correlation rule for inclusion in the list of threshold correlation rules, network management platform 101 causes a rule detail and node selection interface to be displayed. The rule detail and node selection interface is configured to receive user inputs regarding one or more parameters that correspond to various rule detail options and user inputs that correspond to node selection(s) for which the threshold correlation rule is to be generated.

The network management platform 101, for example, is configured to process one or more parameter selection inputs received by way of the rule detail and node selection interface comprising a plurality of parameter input fields. Each parameter input field of the plurality of parameter input fields is configured to receive a parameter selection corresponding to a detail for generating a threshold correlation rule. In some embodiments, the plurality of parameter input fields comprise one or more fields configured to receive a rule name, a domain, a network service provider name, a network technology, a priority of the rule being generated, a service affected, or some other suitable detail.

In some embodiments, the one or more parameter selection inputs are received by way of a drill-down menu in the rule detail and node selection interface. In some embodiments, one or more input fields in the rule detail and node selection interface that are configured to receive the node selection inputs are drill-down menus. In some embodiments, as one or more of the parameter selection inputs and/or the node selection inputs are received, network management platform 101 is configured to limit selectable and/or presented options in certain parameter input fields and/or node selection input fields. In some embodiments, based on different combinations of parameter selection inputs and/or node selection inputs that are received, the network management platform 101 causes one or more of the parameter selection input fields and/or the node selection input fields to be locked, inaccessible, accessible, viewable, hidden, etc.

In some embodiments, the network management platform 101 is configured to cause different combinations of the parameter input fields to be minimum parameter input fields that are to have received at least one parameter selection input before the network management platform 101 allows the process of generating a new threshold correlation rule to continue.

For example, if the graphical user interface comprises five parameter input fields A, B, C, D and E, and if parameter input field A receives a parameter selection input, then the network management platform 101 may be configured to indicate that at least parameter input fields B and C are to receive at least one parameter selection input before the network management platform 101 allows the process to continue. Similarly, in such an example, if parameter input field D receives a parameter selection input, then the network management platform 101 may be configured to indicate that at least parameter input fields C and E are to receive at least one parameter selection input before the network management platform 101 allows the process to continue.

To select one or more nodes for inclusion in the threshold correlation rule, network management platform 101 processes one or more node selection inputs received by way of the rule detail and node selection interface. In some embodiments, rule detail and node selection interface comprises one or more input fields configured to receive an input indicative of at least one of a geographical location, a cluster name, a node aggregation level, a pod level, or some other suitable parameter for identifying a node. In some embodiments, network management platform 101 is configured to facilitate uploading of data indicative of the node(s) and/or associated network elements to be included in the threshold correlation rule. In response to the uploaded data, the network management platform 101 is configured to recognize and parse the information regarding the node inputs and populate the node selection input fields to further the threshold correlation rule generation process.

Based on the user inputs received by way of the rule detail and node selection interface, network management platform 101 causes the graphical user interface to display and populate a list of one or more KPIs associated with monitoring the communication network. The KPIs, for example, are those that network management platform 101 recognizes as being associated with the one or more parameter selection inputs and the node selection inputs.

In some embodiments, to further narrow the list of KPIs, network management platform 101 facilitates searching the KPIs included in the list of KPIs by way of a word search and/or a group name to which one of the more of the KPIs are linked. For example, if the list of KPIs includes 1,000 KPIs, 10 KPIs are linked to KPI Group 1, 5 KPIs are linked to KPI Group 2, and two of the KPIs in KPI Group 1 and three of the KPIs in KPI Group 2 are also linked to KPI Group 3, network management platform 101 is configured to cause the appropriately linked KPIs to be included in the list of KPIs according to the KPI group that is selected for display in the graphical user interface.

Network management platform 101 is configured to cause one or more of the KPIs in the list of KPIs to be selected for inclusion in the threshold correlation rule. In some embodiments, one or more of the KPIs are selected for inclusion in the threshold correlation rule based on a drag and drop operation from the list of the KPIs to a KPI selection workspace in the graphical user interface. In some embodiments, the one or more KPIs are selected from the list of KPIs and caused to be added to the KPI selection workspace by double-clicking a KPI in the list of KPIs, or by way of some other suitable action. In some embodiments, network management platform 101 is configured to facilitate uploading of one or more KPIs and any details associated thereof that are to be included in the threshold correlation rule.

According to various embodiments, network management platform 101 is configured to facilitate causing the threshold correlation rule to be run on-demand and/or according to a predefined schedule. In some embodiments, in response to one or more KPIs being selected for inclusion in the threshold correlation rule, network management platform 101 causes the graphical user interface to display a setup interface.

The network management platform 101 then processes one or more user inputs associated with a frequency that the threshold correlation rule is to be applied as a basis for monitoring one or more of the selected KPIs. In some embodiments, the frequency is one or more of every 15 minutes, daily, weekly, monthly, hourly, at a bouncing busy hour, at a network busy hour, at a busiest day, or some other custom frequency timing.

In some embodiments, the bouncing busy hour, network busy hour and/or the busiest day is determined by network management platform 101 (e.g., according to the system data stored in the central data repository 103). In some embodiments, the network management platform 101 determines the bouncing busy hour, network busy hour and/or the busiest day according to information defining the bouncing busy hour, network busy hour and/or the busiest day received from the network service provider monitoring system(s) 109.

In some embodiments, the network management platform 101 is configured to cause more than one selection made by way of the threshold comparison frequency portion of the setup interface to be combined into one threshold correlation rule. For example, a threshold correlation rule may be optionally set to be run daily, weekly and monthly, etc.

In some embodiments, the network management platform 101 is configured to check multiple instances of consecutive KPI values to determine if a threshold for the KPI being monitored has been breached and, if a preset quantity of a some identified quantity of the consecutive KPI values are determined to breach a threshold for the KPI, then the network management platform 101 causes an alert to be output or an action to occur based on a determination that the breaching of the KPI threshold is consistent enough to warrant generating an alert or causing some action to occur.

For example, network management platform 101 is configured to process one or more threshold comparison and consistency conditions that are received by way of the graphical user interface. In some embodiments, the threshold comparison and consistency condition inputs comprise an option to limit situations in which a breach of a preset threshold causes an alert to occur. For example, if a threshold is breached once, for some KPIs a user may want to have the alert be generated immediately upon each instance of the breach. But, for some KPIs, a user may not want to have any alert be generated unless there is some trend or consistency in a KPI being monitored. To limit the instances of an alert being generated to those that are indicative of a trend or consistent problem, network management platform 101 is configured to count a quantity of consecutive KPI values and determined whether the preset threshold has been breached. For example, the graphical user interface may include an option to check whether the threshold comparison produced a consistent result, an option to define how many consecutive KPI values are to be counted as a rolling sample size, and how many instances out of the most recent consecutive KPI values having the quantity of values defined by way of the graphical user interface are a minimum quantity of instances of a threshold breach that are to occur that triggers the generation of an alert. In some embodiments, the minimum quantity of instances that are defined in a threshold correlation rule for triggering an alert to be generated may simple be a quantity that is accumulated over time without a rolling correspondence to a most recent predefined quantity of KPI values and without any limitation on time. In some embodiments, the minimum quantity of instances that are defined in a threshold correlation rule for triggering an alert to be generated may simple be a quantity that is accumulated over time without a rolling correspondence to a most recent predefined quantity of KPI values, but within a preset period of time such as one minute, one hour, one day, one month, one year, any alternative quantity thereof, within preset times and/or dates, or some other suitable period of time.

In some embodiments, such breach consistency condition inputs comprise a first quantity of KPI values defining a first quantity of consecutive KPI values to compare to a threshold comparison target according to a threshold comparison condition to determine whether one or more of the first quantity of consecutive KPI values results in the threshold comparison condition being true. For example, the first quantity may be set as 10, 20, 5, 2, or some other suitable number that a user defines for the threshold correlation rule.

The breach consistency condition inputs also comprise a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate. For example, the second quantity may be set as 2, 3, 5, 7, 10 or some other suitable quantity that is less than or equal to the first quantity.

For example, consider a situation in which KPI values for a KPI being monitored amount to 60 KPI values over the course of one hour. Of course, other quantities and frequencies of KPI values may differ, but this example is merely to demonstrate the capabilities that network management platform 101 provides to a user seeking to limit alerts to situations that the network management platform 101 determines corresponds to the user-defined breach constancy check.

In this example, assume the user has input "10" as the quantity of consecutive KPI values that are considered for the consistency check, and also assume the user has input "3" as the quantity of instances within the last 10 KPI values that are the minimum quantity of breaches to occur to cause trigger an alert. Now, as the 60 KPI values over the course of the one hour are received, if KPI value 5/60, 9/60 and 18/60 are determined to breach a preset threshold for the KPI being monitored, no alarm would be triggered, because three instances of threshold breaches did not occur within 10 consecutive KPI values. However, if KPI value 14/60 were to breach the preset threshold, then generation of the alert would be triggered based on the determination that KPI values 5/60, 9/60 and 14/60 each breached the preset threshold within the last 10 KPI values when KPI value 14/60 is determined to breach the preset threshold. Now, reverting back to the example in which KPI value 5/60, 9/60 and 18/60 are determined to breach a preset threshold for the KPI being monitored and no alert has been triggered, the most recent 10 consecutive KPI values are continuously considered on a rolling basis such that if KPI values 16/60 is determined to breach the preset threshold, the network management platform 101 causes generation of the alert to be triggered based on KPI values 9/60, 16/60 and 18/60 being determined to breach the preset threshold.

In some embodiments, the network management platform 101 processes a user input that defines a threshold comparison condition. In some embodiments, the threshold comparison condition is a textual input that defines a rule. In some embodiments, the threshold comparison condition is based on one or more selectable options. In some embodiments, user inputs received by way of the graphical user interface to define the threshold comparison condition are received by way of a graphical user interface that facilitates defining one or more KPIs that are being monitored, one or more comparison conditions (e.g., greater than, less than, equal to, not equal to, greater than or equal to, less than or equal to, within a range, outside a range, or some other suitable basis upon which values may be compared), an option to compare KPI values for different KPIs that are added for inclusion in the threshold correlation rule, and a preset threshold to which the one or more KPI values may be compared.

In some embodiments, the condition editor facilitates adding two or more conditions that are to be included in the threshold comparison condition being defined. In some embodiments, network management platform 101 facilitates defining different combinations of the two or more conditions that may be considered as being true to constitute a breach.

In some embodiments, network management platform 101 is configured to end, cancel or otherwise close an alert condition based on a determination that the KPI being monitored has returned back to an expected operating condition (e.g., the KPI value has returned to a non-breach level). In some embodiments, network management platform 101 is configured to perform a consistency check similar to that discussed with respect to breach detection and/or alert generation, wherein a quantity of consecutive KPI values are considered and, if a quantity of instances wherein the KPI being monitored is back to being in the expected operating range for a minimum quantity of instances within the range of consecutive KPI values, then the network management platform 101 causes the alert condition to end, be canceled, or otherwise closed.

Network management platform 101 causes the threshold correlation rule to be generated based on the threshold comparison input(s) and the breach consistency condition input(s), and optionally the closure comparison input(s) and the closure consistency condition input(s). Upon generating the threshold correlation rule, network management platform 101 causes the newly created rule to be added to the threshold correlation rule list.

FIG. 2 is a diagram of a graphical user interface 200, in accordance with one or more embodiments. Network management platform 101 is configured to cause graphical user interface 200 to be output to a display.

Graphical user interface 200 is a threshold correlation rule list. The threshold correlation rule list comprises a list of threshold correlation rules that are pre-existing and available for viewing and/or modification. The threshold correlation rule list includes high level details regarding the information included in the threshold correlation rule such as rule ID, rule name, domain, network service provider name, technology, auto TT, user that created the threshold correlation rule, creation date. In some embodiments, greater, fewer, or alternative information is included in the threshold correlation rule list.

Graphical user interface 200 facilitates the creation of a new threshold correlation rule that is to be added to the threshold correlation rule list. In some embodiments, graphical user interface 200 facilitates selecting one or more of the threshold correlation rules included in the threshold correlation rule list for modification and/or viewing.

In some embodiments, graphical user interface 200 facilitates adding a new threshold correlation rule based a selection of a plus sign icon, or some other suitable user interface icon in graphical user interface 200. In some embodiments, graphical user interface 200 facilitates filtering the threshold correlation rules included in the threshold correlation rule list by way of a filter mechanism actuated by selecting a filter icon included in graphical user interface 200. In some embodiments, the filter mechanism is limited to the information included in the headers shown in the threshold correlation rule list. In some embodiments, the filter mechanism includes options that are beyond those indicated in the headers included in the threshold correlation rule list but by which the threshold correlation rules included in the threshold correlation rule may be identified.

In some embodiments, graphical user interface 200 facilitates adding or removing one or more columns of information included in the threshold correlation rule list by way of a table option icon or some other suitable table editing option.

FIG. 3 is a diagram of a graphical user interface 300, in accordance with one or more embodiments. Network management platform 101 is configured to cause graphical user interface 300 to be output to a display.

Graphical user interface 300 is a rule detail and node selection interface. Graphical user interface 300 is caused to be displayed based on a user input to create a new threshold correlation rule in graphical user interface 200 (FIG. 2).

Graphical user interface 300 comprises a plurality of parameter input fields and a plurality of node and aggregation selection input fields. The parameter input fields correspond to various rule detail options. The node and aggregation selection input fields correspond to node selection(s) for which the threshold correlation rule is to be generated.

In some embodiments, the plurality of parameter input fields comprise one or more fields configured to receive a rule name, a domain, a network service provider name, a network technology, a classification, a priority, an indication as to whether a service is affected, or some other suitable detail. In some embodiments, a classification may be an outage, a reduction in quality, a reduction in speed, a quantity of devices accessing the communication network, etc. In some embodiments, a priority may be emergency, high, medium, low, etc. In some embodiments a whether the service is affected may indicated as yes or no.

In some embodiments, the one or more parameter selection input are received by way of a drop-down menu, radio button(s), textual inputs, some other suitable manner, or a combination thereof.

In some embodiments, the plurality of node and aggregation selection inputs comprise fields to receive an input indicative of at least one of a geographical location, a cluster name, a node aggregation level, a country level, a region, a state/prefecture, a city, a node aggregation, a cluster, a POD level, or some other suitable parameter for identifying a node or group of nodes. In some embodiments, one or more of the node and aggregation selection inputs facilitates selecting all of the options included therein for aggregating all of the options and/or selecting two of more of the options included therein for aggregating two or more of the options included in at least one of the node and aggregation selection input fields.

In some embodiments, graphical user interface 300 includes an option to upload node information corresponding one or more nodes, features and/or details thereof that are to be included and/or identified when creating the threshold correlation rule.

In some embodiments, the one or more node and aggregation selection inputs are received by way of a drop-down menu, radio button(s), textual inputs, some other suitable manner, or a combination thereof In some embodiments, the one or more parameter selection inputs and/or the node selection and aggregation inputs are received by way of a drill-down menu in the rule detail and node selection interface.

In some embodiments, as one or more of the parameter selection inputs and/or the node selection inputs are received, network management platform 101 is configured to limit selectable and/or presented options in certain parameter input fields and/or node selection input fields. In some embodiments, based on different combinations of parameter selection inputs and/or node selection inputs that are received, the network management platform 101 causes one or more of the parameter selection input fields and/or the node selection input fields to be locked, inaccessible, accessible, viewable, hidden, etc.

In some embodiments, the network management platform 101 is configured to cause different combinations of the parameter input fields to be the minimum parameter input fields that are to have received at least one parameter selection input before the network management platform 101 allows the process of generating a new threshold correlation rule to continue.

In some embodiments, graphical user interface includes an option to exclude planned events. If this option is selected, the network management platform 101 is caused to ignore system-known network events that are flagged by a network operator, for example, when applying the threshold correlation rule being generated. For instance, if a network operator is planning to test, change, or perform maintenance on the communication network, and that action would cause an alert associated with a KPI being monitored to be generated, then the network management platform 101 will ignore those instances of a KPI threshold being breached, for example, and exclude KPI values that occur as a result of the planned event from any determination regarding the operating state of the communication network with respect the threshold correlation rule being generated.

After a user has input at least the minimum parameter inputs and/or the minimum node and aggregation selection inputs, the user may then select a "next" option, or some other suitable instruction icon to cause the network management platform 101 to advance to a next step in the threshold correlation rule generation process.

Figure 4:
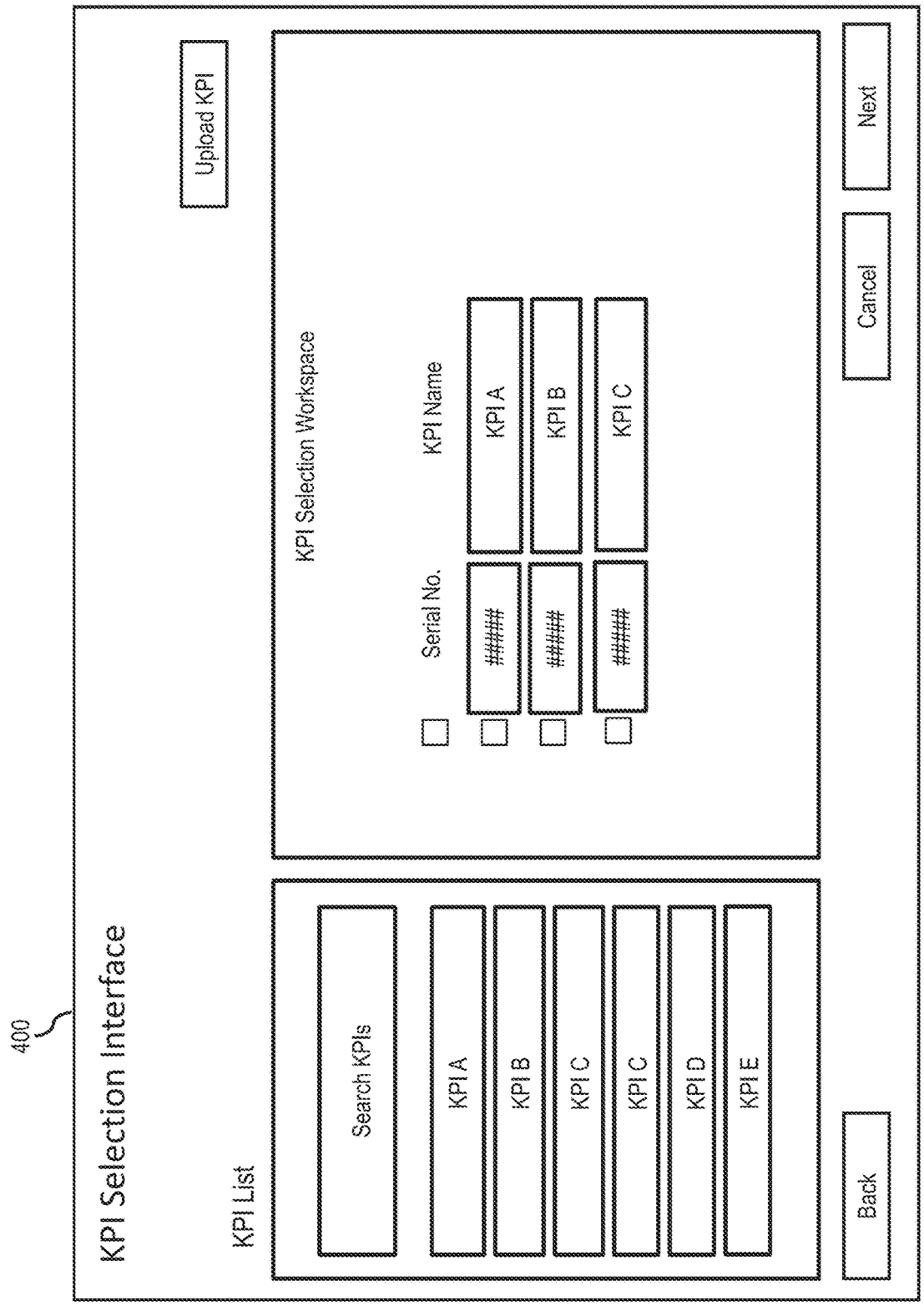
FIG. 4 is a diagram of a graphical user interface, in accordance with one or more embodiments.

FIG. 4 is a diagram of a graphical user interface 400, in accordance with one or more embodiments. Network management platform 101 is configured to cause graphical user interface 400 to be output to a display.

Graphical user interface 400 is a KPI selection interface. Graphical user interface 400 is caused to be displayed based on a user input to proceed to a next step in generating the threshold correlation rule in graphical user interface 300 (FIG. 3).

Based on the user inputs receive by way of the parameter input fields and the node selection and aggregation selection input fields in graphical user interface 300, network management platform 101 causes graphical user interface 400 to display and populate a list of one or more KPIs associated with monitoring the communication network. The KPIs included in the KPI list in user interface 400 are those that network management platform 101 recognizes as being associated with the one or more parameter selection inputs and the node selection inputs.

Graphical user interface 400 includes a search KPI input field configured to receive word searches for KPI names, serial numbers, KPI groups, etc. The network management platform 101 then searches the central data repository 103 for corresponding KPIs and filters the list of KPIs accordingly.

Graphical user interface 400 includes a KPI selection workspace within which one or more selected KPIs are caused to appear based one or more of the KPIs in the list of KPIs being selected for inclusion in the threshold correlation rule. In some embodiments, one or more of the KPIs are selected for inclusion in the threshold correlation rule based on a drag and drop operation from the list of the one or more KPIs to the KPI selection workspace in the graphical user interface. In some embodiments, the one or more KPIs are selected from the list of KPIs and caused to be added to the KPI selection workspace by double-clicking a KPI in the list of KPIs, or by way of some other suitable action. In some embodiments, graphical user interface 400 includes an option to upload a KPI and any details associated with the uploaded KPI for inclusion in the KPI list and/or the KPI selection workspace.

Graphical user interface 400 is shown in FIG. 4 as an example wherein KPI A, KPI B and KPI C are selected by causing the KPIs A-C to be added to the threshold correlation rule generation workspace. The threshold correlation rule generation workspace includes the KPI name and a serial number associated with the KPI. In some embodiments, the KPI selection workspace displays one of the serial number or the KPI name.

After a user has selected one or more KPIs, the user may then proceed to a next step in the threshold correlation rule generation process by selecting a "next" option, or some other suitable instruction icon in graphical user interface 400.

Figure 5B:
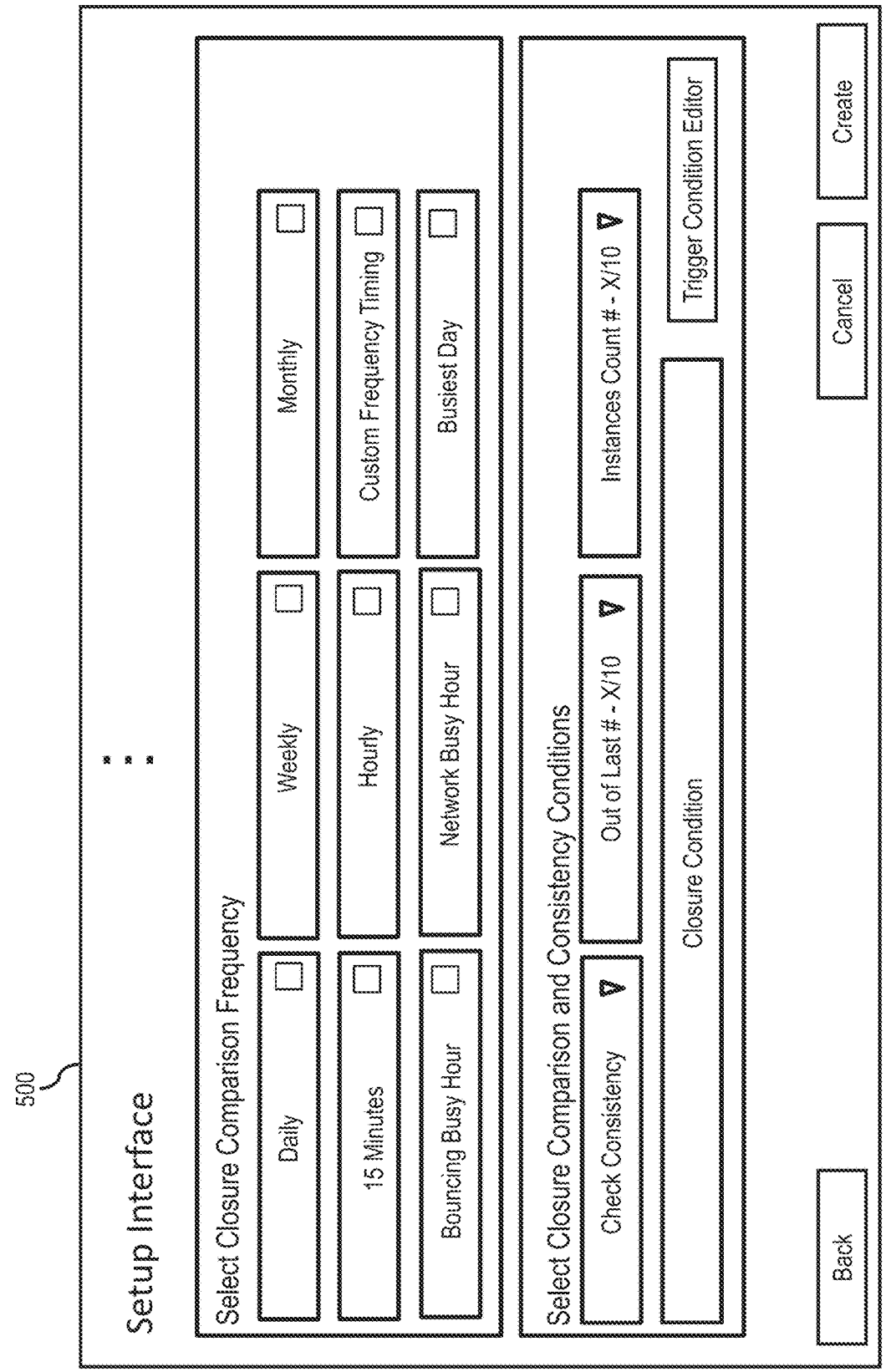
FIG. 5B is a diagram of a graphical user interface, in accordance with one or more embodiments.

FIGS. 5A and 5B are diagrams of a graphical user interface 500, in accordance with one or more embodiments. Network management platform 101 is configured to cause graphical user interface 500 to be output to a display. In some embodiments the portions of graphical user interface 500 included in FIGS. 5A and 5B are a unitary display that is scrollable between the views shown in FIGS. 5A and 5B. In some embodiments the portions of graphical user interface 500 included in FIGS. 5A and 5B are separate display widows that are navigable to and from one another by way of a next button, back button, page swipe, or other suitable action to switch between the views shown in FIGS. 5A and 5B.

Graphical user interface 500 is a threshold correlation rule setup interface. Graphical user interface 500 is caused to be displayed based on a user input to proceed to a next step in generating the threshold correlation rule in graphical user interface 400 (FIG. 4).

Graphical user interface 500 includes input fields configured to receive user inputs associated with setting a threshold comparison frequency that the threshold correlation rule is to be run, threshold comparison and consistency conditions, optionally setting a closure comparison frequency, and optionally setting closure comparison and frequency conditions for generating the threshold correlation rule. Network management platform 101 causes the threshold correlation rule to be generated based on the inputs received in the setup interface. The generated threshold correlation rule is added to the threshold correlation rule list in graphical user interface 200 (FIG. 2), and KPI values are processed by network management platform 101 in accordance with the threshold correlation rule that is created to monitor one or more KPIs included in the threshold correlation rule.

In some embodiments, the frequency input fields are configured to receive user inputs corresponding to a frequency that the threshold correlation rule is to be applied as a basis for monitoring one or more of the selected KPIs. In some embodiments, the frequency is one or more of every 15 minutes, daily, weekly, monthly, hourly, at a bouncing busy hour, at a network busy hour, at a busiest day, or some other custom frequency timing.

In some embodiments, graphical user interface 500 configured to facilitate more than one selection made by way of the threshold comparison frequency portion of the setup interface is capable of be combined and included in one threshold correlation rule. For example, a threshold correlation rule may be optionally set to be run daily, weekly and monthly, etc.

Graphical user interface 500 includes input fields in the threshold comparison and consistency conditions portion of the user interface to facilitate the checking of multiple instances of consecutive KPI values to determine if a threshold for the KPI being monitored has been breached and, if a preset quantity of some identified quantity of the consecutive KPI values are determined to breach a threshold for the KPI.

For example, graphical user interface 500 is configured to receive one or more threshold comparison and consistency conditions that added to the threshold correlation rule by selecting an option to check the consistency of the threshold breach. In some embodiments, the consistency option is a drop-down box that indicates yes and provides types of options for different consistency checks or enable a selection of no such that any breach causes an alert to be generated.

In some embodiments, the threshold comparison and consistency condition inputs comprise an option to limit situations in which a breach of a preset threshold causes an alert to occur based on a quantity of most recent KPI values, e.g., out of the last user input quantity received by way of a corresponding input field, and a quantity of instances that a preset threshold for the KPI being monitored was breached within the user input quantity indicated the most recent (e.g., 10 KPI values) received by a corresponding input field.

In some embodiments, such breach consistency condition inputs comprise a first quantity of KPI values defining a first quantity of consecutive KPI values to compare to a threshold comparison target according to a threshold comparison condition to determine whether one or more of the first quantity of consecutive KPI values results in the threshold comparison condition being true. For example, the first quantity may be set as 10, 20, 5, 2, or some other suitable number that a user defines for the threshold correlation rule.

The breach consistency condition inputs also comprise a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate. For example, the second quantity may be set as 2, 3, 5, 7, 10 or some other suitable quantity that is less than or equal to the first quantity.

Graphical user interface 500 also includes a threshold comparison condition input field. In some embodiments, the threshold comparison condition is a textual input that defines a rule. In some embodiments, the threshold comparison condition is based on one or more selectable options which are made available by triggering a condition editor icon which causes graphical user interface 600 (FIG. 6) to be displayed. In some embodiments, user inputs received by way of the graphical user interface to define the threshold comparison condition, whether that be by way of user-input text or by way of insertion from a condition created in the condition editor define for one or more KPIs that are being monitored, one or more comparison conditions (e.g., greater than, less than, equal to, not equal to, greater than or equal to, less than or equal to, within a range, outside a range, or some other suitable basis upon which values may be compared), and facilitates the capability of comparing KPI values for different KPIs that are added for inclusion in the threshold correlation rule, as a preset threshold to which the one or more KPI values may be compared.

In some embodiments, the threshold comparison condition input field facilitates adding two or more conditions that are to be included in the threshold comparison condition being defined, whether that be by way of a user's own textual input or based on an inserted threshold comparison created by way of the condition editor. In some embodiments, the threshold comparison condition input field facilitates defining different combinations of the two or more conditions that may be considered as being true to constitute a breach, and the network management platform 101 processes the multiple conditions in one threshold correlation rule.

In some embodiments, similar to the threshold comparison frequency input fields and the threshold comparison and consistency condition input fields, graphical user interface 500 includes closure comparison frequency input fields and closure comparison and consistency condition input fields. The network management platform 101 is configured to end, cancel or otherwise close an alert condition based on a determination that the KPI being monitored has returned back to an expected operating condition (e.g., the KPI value has returned to a non-breach level) based on the user inputs received by way of graphical user interface 500. In some embodiments, network management platform 101 is configured to perform a similar consistency check wherein a quantity of consecutive KPI values are considered and, if a quantity of instances wherein the KPI being monitored is back to being in the expected operating range for a minimum quantity of instances within the range of consecutive KPI values, then the network management platform 101 causes the alert condition to end, be canceled, or otherwise closed. In some embodiments, graphical user interface 500 facilitates other options that are selectable for ending, closing or canceling an alert such as a preset period of time following the alert, a preset quantity of instances that indicate the KPI being monitored has returned to the expected operating range, or some other suitable basis.

Network management platform 101 causes threshold correlation rule to be generated based on the threshold comparison input(s) and the breach consistency condition input(s), and optionally the closure comparison input(s) and the closure consistency condition input(s). The optional closure comparison inputs and the optional closure consistency condition inputs make is possible for network management platform 101 to operate in a "headless" mode such that detected alerts can be cleared automatically such that alerts may not overly burden a user if the condition causing the alert has been resolved.

Figure 6:
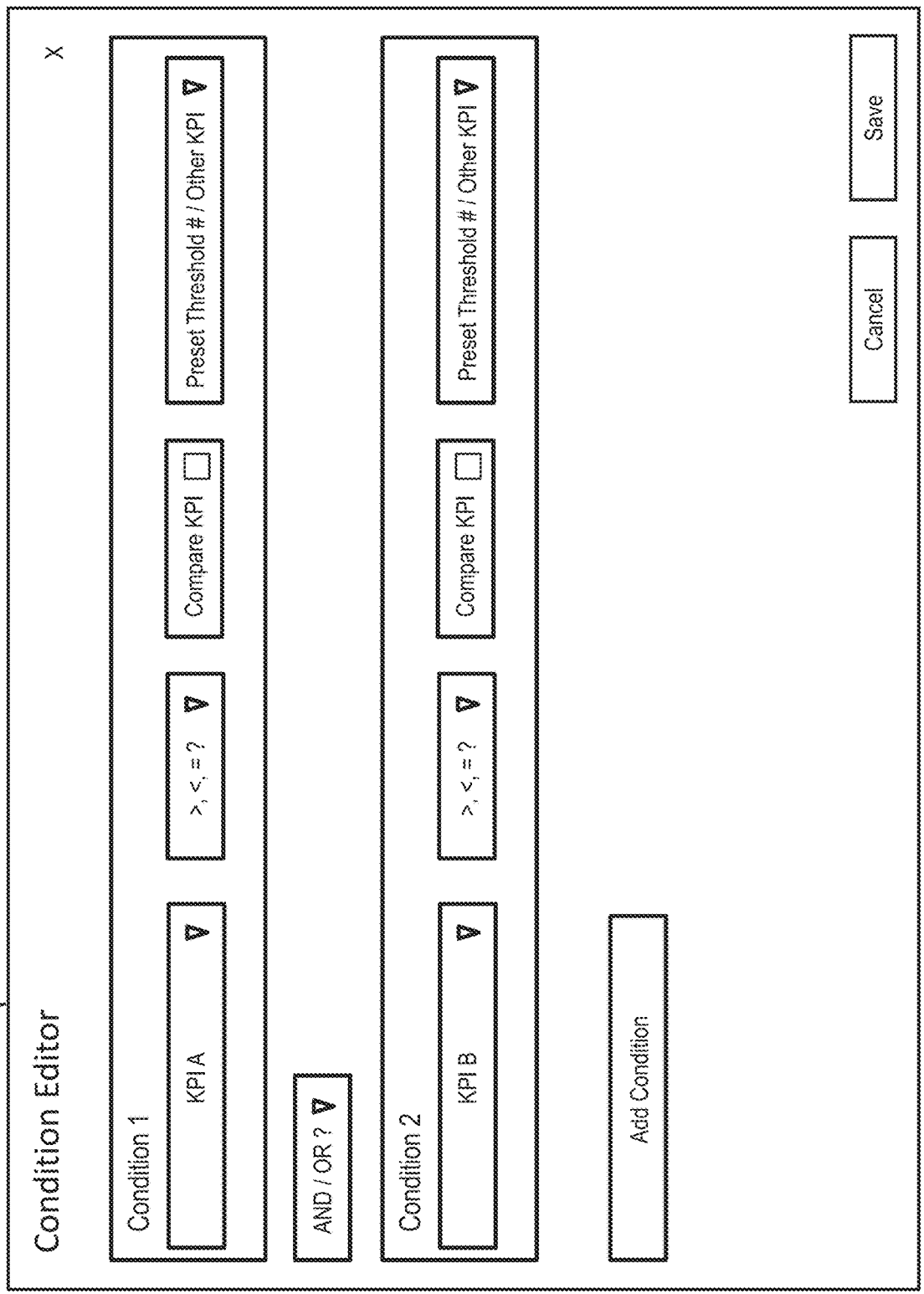
FIG. 6 is a diagram of a graphical user interface, in accordance with one or more embodiments.

FIG. 6 is a diagram of a graphical user interface 600, in accordance with one or more embodiments. Network management platform 101 is configured to cause graphical user interface 600 to be output to a display.

Graphical user interface 600 is a condition editor. Graphical user interface 600 is caused to be displayed based on a selection of a trigger condition editor in graphical user interface 500 (FIG. 5) when creating the threshold comparison condition or the closure condition.

Graphical user interface 600 included user input fields configured to receive user inputs to define the threshold comparison condition that is to be included in the threshold condition input field in graphical user interface 500 (FIG. 5). To define the threshold comparison condition, the condition editor includes user input fields for selecting one or more KPIs that were added to the KPI selection workspace for inclusion in the threshold correlation rule, one or more comparison conditions (e.g., greater than, less than, equal to, not equal to, greater than or equal to, less than or equal to, within a range, outside a range, or some other suitable basis upon which values may be compared), an option to select a different KPI of those KPIs that were added for inclusion in the threshold correlation rule, and an input setting a preset threshold to which the one or more KPI values may be compared.

In some embodiments, the condition editor facilitates adding two or more conditions that are to be included in the threshold comparison condition being defined. In some embodiments, network management platform 101 facilitates defining different combinations of the two or more conditions that may be considered as being true to constitute a breach. The condition editor includes an AND/OR option that links additional conditions added to the threshold correlation rule. For example, if a threshold correlation rule is generated having a threshold comparison condition that includes two conditions, condition 1 and condition 2, wherein if an OR option is selected, an alert is caused to be generated if condition 1 is true OR condition 2 is true, but if the AND option is selected, both condition 1 and condition 2 must be true for the alert to be generated.

Similar to creating a threshold comparison condition, the condition editor may also be caused to be displayed when creating a closure condition.

Graphical user interface 600 then facilitates saving and inclusion of the created condition as the threshold comparison condition or the closure condition in graphical user interface 500 based on a user selection of an "save" icon, or some other suitable instruction icon in graphical user interface 600. By saving and adding the created condition as the threshold comparison condition or the closure condition, network management platform 101 causes the created condition to be added to the threshold comparison condition input field or the closure condition input field in graphical user interface 500.

In some embodiments, a user may navigate back to user interface 500 by selecting "cancel" icon or an "x" icon to close graphical user interface 600, or some other suitable instruction icon in graphical user interface 600.

Figure 7:
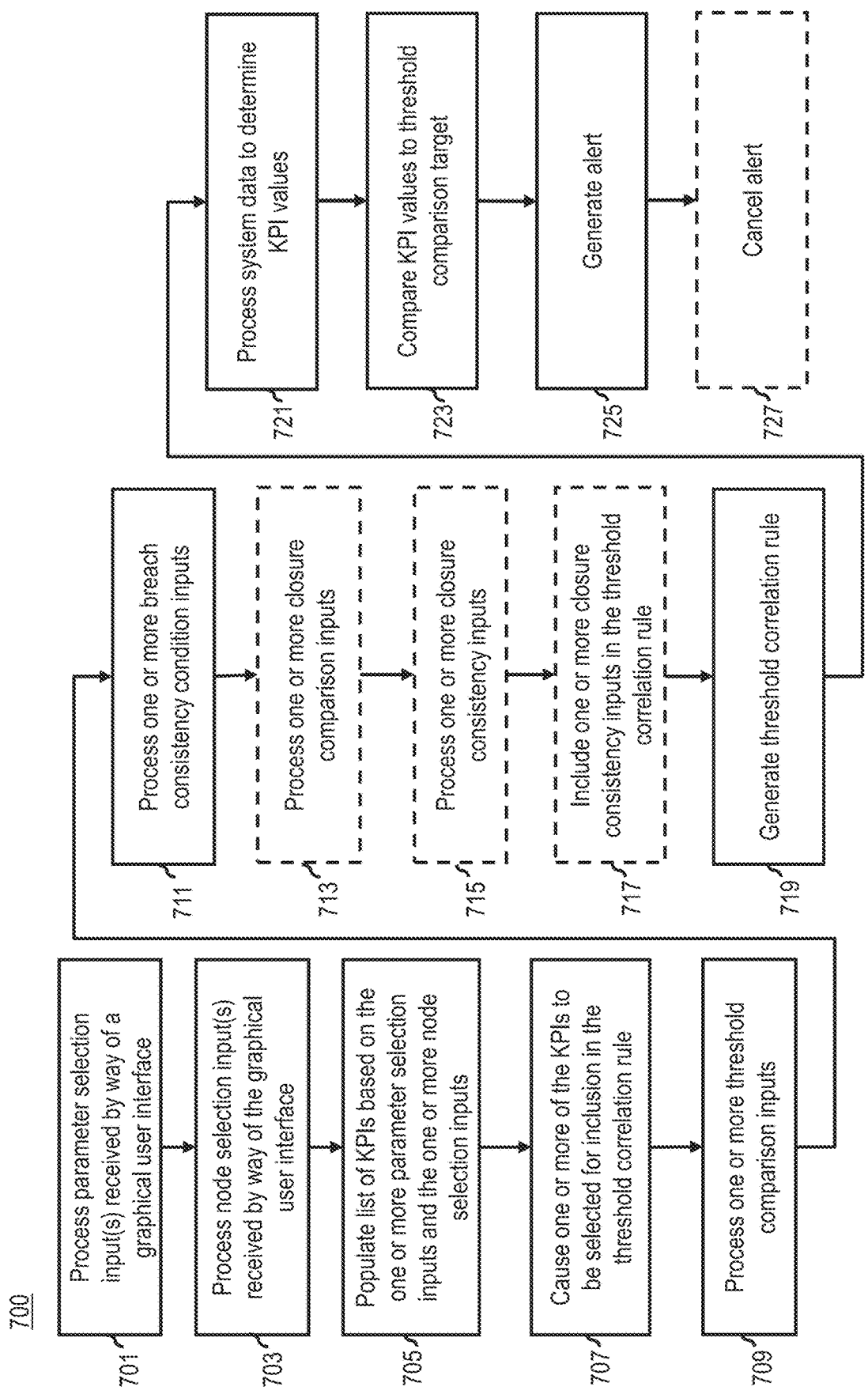
FIG. 7 is a flowchart of a process for generating a threshold correlation rule associated with monitoring one or more KPI values, in accordance with one or more embodiments.

FIG. 7 is a flowchart of a process 700 for generating and applying a threshold correlation rule associated with monitoring one or more KPI values, in accordance with one or more embodiments. In some embodiments, the network management platform 101 (FIG. 1) performs the process 700.

In step 701, one or more parameter selection inputs received by way of a graphical user interface comprising a plurality of parameter input fields are processed. Each parameter input field of the plurality of parameter input fields is configured to receive a parameter selection corresponding to a threshold correlation rule associated with monitoring a communication network.

In step 703, one or more node selection inputs received by way of the graphical user interface are processed.

In step 705, a list of one or more key performance indicators (KPIs) associated with monitoring the communication network is caused to be populated based on the one or more parameter selection inputs and the one or more node selection inputs.

In step 707, one or more of the KPIs are caused to be selected for inclusion in the threshold correlation rule based on a selection of one or more of the KPIs included in the list of the one or more KPIs.

In step 709, one or more threshold comparison inputs received by way of the graphical user interface are processed. The threshold comparison inputs comprise at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target.

In step 711, one or more breach consistency condition inputs are processed. The breach consistency condition inputs comprise a first quantity of KPI values defining a first quantity of consecutive KPI values to compare to the threshold comparison target according to the threshold comparison condition to determine whether one or more of the first quantity of consecutive KPI values results in the threshold comparison condition being true. The breach consistency condition inputs also comprise a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate.

In step 713, one or more closure comparison inputs received by way of the graphical user interface are processed. The closure comparison inputs comprise at least one KPI of the one or more KPIs selected for inclusion in the threshold correlation rule, a closure comparison target to which a KPI value of the at least one KPI is compared, and a closure comparison condition identifying a basis for comparing the KPI value of the at least one KPI to the closure comparison target.

In step 715, one or more closure consistency condition inputs are processed. The one or more closure consistency condition inputs comprise a third quantity of KPI values defining a second quantity of consecutive KPI values to compare to the closure comparison target according to the closure comparison condition to determine whether one or more of the second quantity of consecutive KPI values results in the closure comparison condition being true. The one or more closure consistency condition inputs also comprise a fourth quantity of KPI values defining a second quantity of instances within the second quantity of consecutive KPI values that the closure comparison condition being true is a minimum quantity indicating that the operating state of the communication network is within the preset operating performance level that the at least one KPI is configured to indicate.

In optional step 717, the one or more closure comparison inputs and the one or more closure consistency condition inputs are caused to be included in the threshold correlation rule.

In step 719, the threshold correlation rule is generated based on the one or more threshold comparison inputs and the one or more breach consistency condition inputs.

In step 721, system data associated with operating the communication network is processed to determine KPI values corresponding to the at least one KPI.

In step 723, each KPI value corresponding to the at least one KPI is compared to the threshold comparison target.

In step 725, in response to a determination that the operating state of the communication network is outside the preset performance level based on a determination that first quantity of instances within the first quantity of consecutive KPI values that the threshold comparison condition is true has been reached, an alert is caused to be generated indicating that the operating state of the communication network is outside the preset performance level.

In optional step 727, in response to a determination that the operating state of the communication network is within the preset performance level based on a determination that second quantity of instances within the second quantity of consecutive KPI values that the closure comparison condition is true has been reached, the alert is caused to be canceled.

In some embodiments, the first quantity of consecutive KPI values is continually updated such that the first quantity of consecutive KPI values includes a set of most recent KPI values equal in number to the first quantity of KPI values.

In some embodiments, the second quantity of consecutive KPI values is continually updated such that the second quantity of consecutive KPI values includes a set of most recent KPI values equal in number to the third quantity of KPI values.

In some embodiments, the second quantity of consecutive KPI values begins to toll after a determination is made to generate the alert.

In some embodiments, the first quantity of instances is different from the second quantity of instances.

In some embodiments, the first quantity of consecutive KPI values is difference from the second quantity of consecutive KPI values.

In some embodiments, the threshold comparison condition and the closure comparison condition are opposite from one another such that when the threshold comparison condition is true, the closure comparison condition is false.

In some embodiments, the at least one KPI received as one of the threshold comparison inputs is equal to the at least one KPI received as one of the closure comparison inputs.

In some embodiments, the at least one KPI received as one of the threshold comparison inputs is different from the at least one KPI received as one of the closure comparison inputs.

In some embodiments, two or more KPIs are selected for inclusion in the threshold correlation rule, and the KPI values of the at least one KPI that are compared to the threshold comparison target are compared to KPI values of a different KPI of the two or more KPIs selected for inclusion in the threshold correlation rule.

In some embodiments, the threshold comparison condition is received by way of a text box in the graphical user interface. In some embodiments, the threshold condition is received by way of a condition editor user interface and the text box is populated with the threshold comparison condition.

Figure 8:
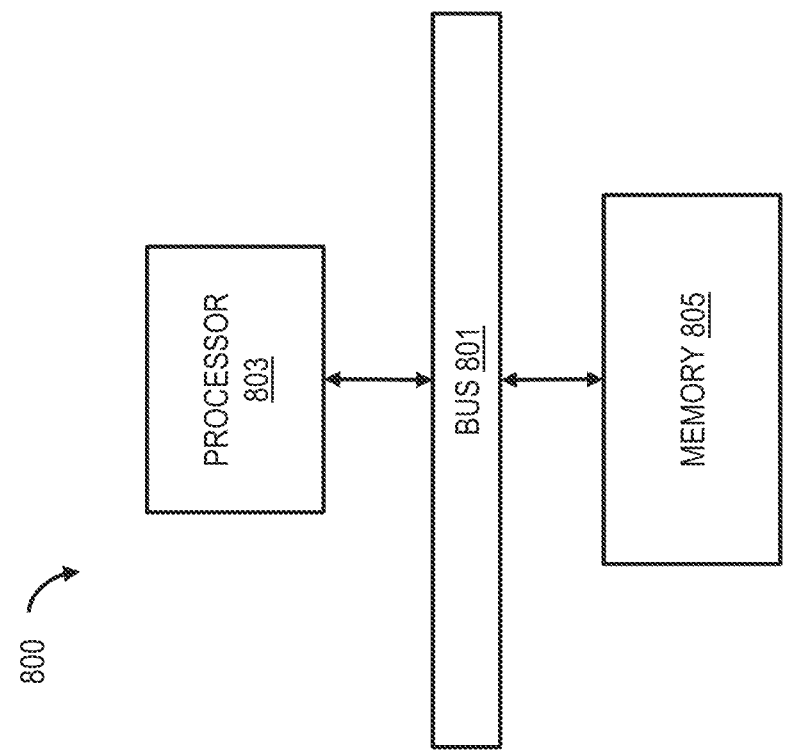
FIG. 8 is a functional block diagram of a computer or processor-based system upon which or by which an embodiment is implemented.

FIG. 8 is a functional block diagram of a computer or processor-based system 800 upon which or by which an embodiment is implemented.

Processor-based system 800 is programmed to generate and apply a threshold correlation rule associated with monitoring one or more KPI values, as described herein, and includes, for example, bus 801, processor 803, and memory 805 components.

In some embodiments, the processor-based system is implemented as a single "system on a chip." Processor-based system 800, or a portion thereof, constitutes a mechanism for performing one or more steps of generating and applying a threshold correlation rule associated with monitoring one or more KPI values.

In some embodiments, the processor-based system 800 includes a communication mechanism such as bus 801 for transferring and/or receiving information and/or instructions among the components of the processor-based system 800. Processor 803 is connected to the bus 801 to obtain instructions for execution and process information stored in, for example, the memory 805. In some embodiments, the processor 803 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 803. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 803 performs a set of operations on information as specified by a set of instructions stored in memory 805 related to generating and applying a threshold correlation rule associated with monitoring one or more KPI values. The execution of the instructions causes the processor to perform specified functions.

The processor 803 and accompanying components are connected to the memory 805 via the bus 801. The memory 805 includes one or more of dynamic memory (e.g., RAM, magnetic disk, writable optical disk, etc.) and static memory (e.g., ROM, CD-ROM, etc.) for storing executable instructions that when executed perform the steps described herein to generate and apply a threshold correlation rule associated with monitoring one or more KPI values. The memory 805 also stores the data associated with or generated by the execution of the steps.

In one or more embodiments, the memory 805, such as a random-access memory (RAM) or any other dynamic storage device, stores information including processor instructions for generating and applying a threshold correlation rule associated with monitoring one or more KPI values. Dynamic memory allows information stored therein to be changed. RAM allows a unit of information stored at a location called a memory address to be stored and retrieved independently of information at neighboring addresses. The memory 805 is also used by the processor 803 to store temporary values during execution of processor instructions. In various embodiments, the memory 805 is a read only memory (ROM) or any other static storage device coupled to the bus 801 for storing static information, including instructions, that is not capable of being changed by processor 803. Some memory is composed of volatile storage that loses the information stored thereon when power is lost. In some embodiments, the memory 805 is a non-volatile (persistent) storage device, such as a magnetic disk, optical disk or flash card, for storing information, including instructions, that persists even when the system 800 is turned off or otherwise loses power.

The term "computer-readable medium" as used herein refers to any medium that participates in providing information to processor 803, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to method comprising processing, by a processor, one or more parameter selection inputs received by way of a graphical user interface comprising a plurality of parameter input fields. Each parameter input field of the plurality of parameter input fields is configured to receive a parameter selection corresponding to a threshold correlation rule associated with monitoring a communication network. The method also comprises processing one or more node selection inputs received by way of the graphical user interface. The method further comprises causing a list of one or more key performance indicators (KPIs) associated with monitoring the communication network to be populated based on the one or more parameter selection inputs and the one or more node selection inputs. The method additionally comprises causing one or more of the KPIs to be selected for inclusion in the threshold correlation rule based on a selection of one or more of the KPIs included in the list of the one or more KPIs. The method also comprises processing one or more threshold comparison inputs received by way of the graphical user interface. The threshold comparison inputs comprise at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target. The method further comprises processing one or more breach consistency condition inputs. The breach consistency condition inputs comprise a first quantity of KPI values defining a first quantity of consecutive KPI values to compare to the threshold comparison target according to the threshold comparison condition to determine whether one or more of the first quantity of consecutive KPI values results in the threshold comparison condition being true. The breach consistency condition input further comprise a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate. The method additionally comprises generating the threshold correlation rule based on the one or more threshold comparison inputs and the one or more breach consistency condition inputs. The method also comprises processing system data associated with operating the communication network to determine KPI values corresponding to the at least one KPI. The method further comprises comparing each KPI value corresponding to the at least one KPI to the threshold comparison target. The method additionally comprises in response to a determination that the operating state of the communication network is outside the preset performance level based on a determination that first quantity of instances within the first quantity of consecutive KPI values that the threshold comparison condition is true has been reached, causing an alert to be generated indicating that the operating state of the communication network is outside the preset performance level.

Another aspect of this description is related to an apparatus comprising a processor and a memory. The memory has instructions stored thereon that, when executed by the processor, cause the apparatus to process one or more parameter selection inputs received by way of a graphical user interface comprising a plurality of parameter input fields. Each parameter input field of the plurality of parameter input fields is configured to receive a parameter selection corresponding to a threshold correlation rule associated with monitoring a communication network. The apparatus is also caused to process one or more node selection inputs received by way of the graphical user interface. The apparatus is further caused to cause a list of one or more key performance indicators (KPIs) associated with monitoring the communication network to be populated based on the one or more parameter selection inputs and the one or more node selection inputs. The apparatus is additionally caused to cause one or more of the KPIs to be selected for inclusion in the threshold correlation rule based on a selection of one or more of the KPIs included in the list of the one or more KPIs. The apparatus is also caused to process one or more threshold comparison inputs received by way of the graphical user interface. The threshold comparison inputs comprise at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target. The apparatus is further caused to process one or more breach consistency condition inputs. The breach consistency condition inputs comprise a first quantity of KPI values defining a first quantity of consecutive KPI values to compare to the threshold comparison target according to the threshold comparison condition to determine whether one or more of the first quantity of consecutive KPI values results in the threshold comparison condition being true. The breach consistency condition input further comprise a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate. The apparatus is additionally caused to generate the threshold correlation rule based on the one or more threshold comparison inputs and the one or more breach consistency condition inputs. The apparatus is also caused to process system data associated with operating the communication network to determine KPI values corresponding to the at least one KPI. The apparatus is further caused to compare each KPI value corresponding to the at least one KPI to the threshold comparison target. The apparatus is additionally caused to, in response to a determination that the operating state of the communication network is outside the preset performance level based on a determination that first quantity of instances within the first quantity of consecutive KPI values that the threshold comparison condition is true has been reached, cause an alert to be generated indicating that the operating state of the communication network is outside the preset performance level.

Another aspect of this description is related to a non-transitory computer readable having instructions stored thereon that, when executed by the processor, cause an apparatus to process one or more parameter selection inputs received by way of a graphical user interface comprising a plurality of parameter input fields. Each parameter input field of the plurality of parameter input fields is configured to receive a parameter selection corresponding to a threshold correlation rule associated with monitoring a communication network. The apparatus is also caused to process one or more node selection inputs received by way of the graphical user interface. The apparatus is further caused to cause a list of one or more key performance indicators (KPIs) associated with monitoring the communication network to be populated based on the one or more parameter selection inputs and the one or more node selection inputs. The apparatus is additionally caused to cause one or more of the KPIs to be selected for inclusion in the threshold correlation rule based on a selection of one or more of the KPIs included in the list of the one or more KPIs. The apparatus is also caused to process one or more threshold comparison inputs received by way of the graphical user interface. The threshold comparison inputs comprise at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target. The apparatus is further caused to process one or more breach consistency condition inputs. The breach consistency condition inputs comprise a first quantity of KPI values defining a first quantity of consecutive KPI values to compare to the threshold comparison target according to the threshold comparison condition to determine whether one or more of the first quantity of consecutive KPI values results in the threshold comparison condition being true. The breach consistency condition input further comprise a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate. The apparatus is additionally caused to generate the threshold correlation rule based on the one or more threshold comparison inputs and the one or more breach consistency condition inputs. The apparatus is also caused to process system data associated with operating the communication network to determine KPI values corresponding to the at least one KPI. The apparatus is further caused to compare each KPI value corresponding to the at least one KPI to the threshold comparison target. The apparatus is additionally caused to, in response to a determination that the operating state of the communication network is outside the preset performance level based on a determination that first quantity of instances within the first quantity of consecutive KPI values that the threshold comparison condition is true has been reached, cause an alert to be generated indicating that the operating state of the communication network is outside the preset performance level.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method, comprising:
processing, by a processor, one or more parameter selection inputs received by way of a graphical user interface comprising a plurality of parameter input fields, each parameter input field of the plurality of parameter input fields being configured to receive a parameter selection corresponding to a threshold correlation rule associated with monitoring a communication network;
processing one or more node selection inputs received by way of the graphical user interface;
causing a list of one or more key performance indicators (KPIs) associated with monitoring the communication network to be populated based on the one or more parameter selection inputs and the one or more node selection inputs;
causing one or more of the KPIs to be selected for inclusion in the threshold correlation rule based on a selection of one or more of the KPIs included in the list of the one or more KPIs;
processing one or more threshold comparison inputs received by way of the graphical user interface, the threshold comparison inputs comprising at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target;
processing one or more breach consistency condition inputs comprising:
 a first quantity of KPI values defining a first quantity of consecutive KPI values to compare to the threshold comparison target according to the threshold comparison condition to determine whether one or more of the first quantity of consecutive KPI values results in the threshold comparison condition being true; and
 a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate;
generating the threshold correlation rule based on the one or more threshold comparison inputs and the one or more breach consistency condition inputs;
processing system data associated with operating the communication network to determine KPI values corresponding to the at least one KPI;
comparing each KPI value corresponding to the at least one KPI to the threshold comparison target; and
in response to a determination that the operating state of the communication network is outside the preset performance level based on a determination that first quantity of instances within the first quantity of consecutive KPI values that the threshold comparison condition is true has been reached, causing an alert to be generated indicating that the operating state of the communication network is outside the preset performance level.

2. The method of claim 1, further comprising:
processing one or more closure comparison inputs received by way of the graphical user interface, the closure comparison inputs comprising at least one KPI of the one or more KPIs selected for inclusion in the threshold correlation rule, a closure comparison target to which a KPI value of the at least one KPI is compared, and a closure comparison condition identifying a basis for comparing the KPI value of the at least one KPI to the closure comparison target;
processing one or more closure consistency condition inputs comprising:
 a third quantity of KPI values defining a second quantity of consecutive KPI values to compare to the closure comparison target according to the closure comparison condition to determine whether one or more of the second quantity of consecutive KPI values results in the closure comparison condition being true; and
 a fourth quantity of KPI values defining a second quantity of instances within the second quantity of consecutive KPI values that the closure comparison condition being true is a minimum quantity indicating that the operating state of the communication network is within the preset operating performance level that the at least one KPI is configured to indicate;
causing the one or more closure comparison inputs and the one or more closure consistency condition inputs to be included in the threshold correlation rule; and
in response to a determination that the operating state of the communication network is within the preset performance level based on a determination that second quantity of instances within the second quantity of consecutive KPI values that the closure comparison condition is true has been reached, causing the alert to be canceled.

3. The method according to claim 2, wherein the first quantity of consecutive KPI values is continually updated such that the first quantity of consecutive KPI values includes a set of most recent KPI values equal in number to the first quantity of KPI values.

4. The method according to claim 3, wherein the second quantity of consecutive KPI values is continually updated such that the second quantity of consecutive KPI values includes a set of most recent KPI values equal in number to the third quantity of KPI values.

5. The method according to claim 4, wherein the second quantity of consecutive KPI values begins to toll after a determination is made to generate the alert.

6. The method according to claim 3, wherein the first quantity of instances is different from the second quantity of instances.

7. The method according to claim 3, wherein the first quantity of consecutive KPI values is difference from the second quantity of consecutive KPI values.

8. The method according to claim 2, wherein the threshold comparison condition and the closure comparison condition are opposite from one another such that when the threshold comparison condition is true, the closure comparison condition is false.

9. The method according to claim 2, wherein the at least one KPI received as one of the threshold comparison inputs is equal to the at least one KPI received as one of the closure comparison inputs.

10. The method according to claim 2, wherein the at least one KPI received as one of the threshold comparison inputs is different from the at least one KPI received as one of the closure comparison inputs.

11. The method according to claim 1, wherein two or more KPIs are selected for inclusion in the threshold correlation rule, and the KPI values of the at least one KPI that are compared to the threshold comparison target are compared to KPI values of a different KPI of the two or more KPIs selected for inclusion in the threshold correlation rule.

12. The method of claim 1, wherein the threshold comparison condition is received by way of a text box in the graphical user interface.

13. An apparatus, comprising:
a processor; and
a memory having instructions stored thereon that, when executed by the processor, cause the apparatus to:
process one or more parameter selection inputs received by way of a graphical user interface comprising a plurality of parameter input fields, each parameter input field of the plurality of parameter input fields being configured to receive a parameter selection corresponding to a threshold correlation rule associated with monitoring a communication network;
process one or more node selection inputs received by way of the graphical user pinterface;
cause a list of one or more key performance indicators (KPIs) associated with monitoring the communication network to be populated based on the one or more parameter selection inputs and the one or more node selection inputs;
cause one or more of the KPIs to be selected for inclusion in the threshold correlation rule based on a selection of one or more of the KPIs included in the list of the one or more KPIs;
process one or more threshold comparison inputs received by way of the graphical user interface, the threshold comparison inputs comprising at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target;
process one or more breach consistency condition inputs comprising:
a first quantity of KPI values defining a first quantity of consecutive KPI values to compare to the threshold comparison target according to the threshold comparison condition to determine whether one or more of the first quantity of consecutive KPI values results in the threshold comparison condition being true; and
a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate;
generate the threshold correlation rule based on the one or more threshold comparison inputs and the one or more breach consistency condition inputs;
process system data associated with operating the communication network to determine KPI values corresponding to the at least one KPI;
compare each KPI value corresponding to the at least one KPI to the threshold comparison target; and
in response to a determination that the operating state of the communication network is outside the preset performance level based on a determination that first quantity of instances within the first quantity of consecutive KPI values that the threshold comparison condition is true has been reached, cause an alert to be generated indicating that the operating state of the communication network is outside the preset performance level.

14. The apparatus of claim 13, wherein the apparatus is further caused to:
process one or more closure comparison inputs received by way of the graphical user interface, the closure comparison inputs comprising at least one KPI of the one or more KPIs selected for inclusion in the threshold correlation rule, a closure comparison target to which a KPI value of the at least one KPI is compared, and a closure comparison condition identifying a basis for comparing the KPI value of the at least one KPI to the closure comparison target;
process one or more closure consistency condition inputs comprising:
a third quantity of KPI values defining a second quantity of consecutive KPI values to compare to the closure comparison target according to the closure comparison condition to determine whether one or more of the second quantity of consecutive KPI values results in the closure comparison condition being true; and
a fourth quantity of KPI values defining a second quantity of instances within the second quantity of consecutive KPI values that the closure comparison condition being true is a minimum quantity indicating that the operating state of the communication network is within the preset operating performance level that the at least one KPI is configured to indicate;
cause the one or more closure comparison inputs and the one or more closure consistency condition inputs to be included in the threshold correlation rule; and
in response to a determination that the operating state of the communication network is within the preset performance level based on a determination that second quantity of instances within the second quantity of consecutive KPI values that the closure comparison condition is true has been reached, cause the alert to be canceled.

15. The apparatus of claim 14, wherein the first quantity of consecutive KPI values is continually updated such that the first quantity of consecutive KPI values includes a set of most recent KPI values equal in number to the first quantity of KPI values.

16. The apparatus of claim 15, wherein the second quantity of consecutive KPI values is continually updated such that the second quantity of consecutive KPI values includes a set of most recent KPI values equal in number to the third quantity of KPI values.

17. The apparatus of claim 16, wherein the second quantity of consecutive KPI values begins to toll after a determination is made to generate the alert.

18. The apparatus of claim 15, wherein the first quantity of instances is different from the second quantity of instances.

19. A non-transitory computer readable medium having instructions stored thereon that, when executed by a processor, cause an apparatus to:
process one or more parameter selection inputs received by way of a graphical user interface comprising a plurality of parameter input fields, each parameter input field of the plurality of parameter input fields being configured to receive a parameter selection corresponding to a threshold correlation rule associated with monitoring a communication network;
process one or more node selection inputs received by way of the graphical user interface;

cause a list of one or more key performance indicators (KPIs) associated with monitoring the communication network to be populated based on the one or more parameter selection inputs and the one or more node selection inputs;

cause one or more of the KPIs to be selected for inclusion in the threshold correlation rule based on a selection of one or more of the KPIs included in the list of the one or more KPIs;

process one or more threshold comparison inputs received by way of the graphical user interface, the threshold comparison inputs comprising at least one KPI of the one or more KPIs selected for inclusion in the threshold correlation rule, a threshold comparison target to which a KPI value of the at least one KPI is compared, and a threshold comparison condition identifying a basis for comparing the KPI value of the at least one KPI to the threshold comparison target;

process one or more breach consistency condition inputs comprising:
- a first quantity of KPI values defining a first quantity of consecutive KPI values to compare to the threshold comparison target according to the threshold comparison condition to determine whether one or more of the first quantity of consecutive KPI values results in the threshold comparison condition being true; and
- a second quantity of KPI values defining a first quantity of instances within the first quantity of consecutive KPI values that the threshold comparison condition being true is a minimum quantity indicating that an operating state of the communication network is outside a preset operating performance level that the at least one KPI is configured to indicate;

generate the threshold correlation rule based on the one or more threshold comparison inputs and the one or more breach consistency condition inputs;

process system data associated with operating the communication network to determine KPI values corresponding to the at least one KPI;

compare each KPI value corresponding to the at least one KPI to the threshold comparison target; and in response to a determination that the operating state of the communication network is outside the preset performance level based on a determination that first quantity of instances within the first quantity of consecutive KPI values that the threshold comparison condition is true has been reached, cause an alert to be generated indicating that the operating state of the communication network is outside the preset performance level.

20. The non-transitory computer readable medium of claim 19, wherein the apparatus is further caused to:

process one or more closure comparison inputs received by way of the graphical user interface, the closure comparison inputs comprising at least one KPI of the one or more KPIs selected for inclusion in the threshold correlation rule, a closure comparison target to which a KPI value of the at least one KPI is compared, and a closure comparison condition identifying a basis for comparing the KPI value of the at least one KPI to the closure comparison target;

process one or more closure consistency condition inputs comprising:
- a third quantity of KPI values defining a second quantity of consecutive KPI values to compare to the closure comparison target according to the closure comparison condition to determine whether one or more of the second quantity of consecutive KPI values results in the closure comparison condition being true; and
- a fourth quantity of KPI values defining a second quantity of instances within the second quantity of consecutive KPI values that the closure comparison condition being true is a minimum quantity indicating that the operating state of the communication network is within the preset operating performance level that the at least one KPI is configured to indicate;

cause the one or more closure comparison inputs and the one or more closure consistency condition inputs to be included in the threshold correlation rule; and in response to a determination that the operating state of the communication network is within the preset performance level based on a determination that second quantity of instances within the second quantity of consecutive KPI values that the closure comparison condition is true has been reached, cause the alert to be canceled.

* * * * *